(12) United States Patent
Matsumoto

(10) Patent No.: US 7,916,314 B2
(45) Date of Patent: Mar. 29, 2011

(54) FACSIMILE APPARATUS AND PRINTING METHOD WITH CLEANING OF INK-JET NOZZLES BASED ON PRINT RESOLUTION OF RECEIVED IMAGE OR TELEPHONE NUMBER OF SENDER

(75) Inventor: Masayuki Matsumoto, Kitakyusyu (JP)

(73) Assignee: Seiko Epson Corporation, Tokyo (JP)

( * ) Notice: Subject to any disclaimer, the term of this patent is extended or adjusted under 35 U.S.C. 154(b) by 615 days.

(21) Appl. No.: 12/037,663

(22) Filed: Feb. 26, 2008

(65) Prior Publication Data

US 2008/0204485 A1     Aug. 28, 2008

(30) Foreign Application Priority Data

Feb. 26, 2007  (JP) ................ 2007-045094

(51) Int. Cl.
*H04N 1/034* (2006.01)
*H04N 1/32* (2006.01)
*B41J 2/165* (2006.01)
*B41J 29/38* (2006.01)

(52) U.S. Cl. ....... 358/1.13; 358/438; 358/440; 358/468; 358/296; 347/3; 347/5; 347/23

(58) Field of Classification Search ............ 358/1.2, 358/1.8, 1.13, 502, 504, 406, 434, 438, 440, 358/451, 468, 296; 347/3, 5, 9, 14, 22, 23
See application file for complete search history.

(56) References Cited

U.S. PATENT DOCUMENTS 5,721,620 A   2/1998  Arai et al.

FOREIGN PATENT DOCUMENTS

| JP | 03-267868 A  | 11/1991 |
| JP | 3267865 A    | 11/1991 |
| JP | 591268 A     | 4/1993  |
| JP | 2001245078 A | 9/2001  |
| JP | 2001-320518 A| 11/2001 |
| JP | 2003-165231 A| 6/2003  |
| JP | 2004058607 A | 2/2004  |

*Primary Examiner* — Scott A Rogers
(74) *Attorney, Agent, or Firm* — Sughrue Mion, PLLC

(57) ABSTRACT

The invention provides a facsimile apparatus that includes: a receiving section that receives facsimile data; a print head that discharges ink from nozzles so as to print out an image; a cleaning unit that cleans the nozzles of the print head; and a controlling section that controls the operations of the print head and the cleaning unit. In such a configuration of the facsimile apparatus according to an aspect of the invention, the controlling section commands the print head to perform facsimile printing by means of the received facsimile data only after the execution of nozzle-cleaning operations, which are executed by the cleaning unit under the control of the controlling section, if it is judged on the basis of the print image resolution of the received facsimile data that the execution of the nozzle-cleaning operations is necessary.

5 Claims, 6 Drawing Sheets

```
NOZZLE-CLEANING SETTING
   (PRINT-IMAGE RESOLUTION)

RESOLUTION        SETTING
NORMAL MODE       : OFF
FINE MODE         : ON
SUPER-FINE MODE   : ON
```

```
NOZZLE-CLEANING SETTING (COLOR)

COLOR TYPE        SETTING
COLOR MODE        : ON
MONOCHROME MODE   : OFF
```

```
NOZZLE-CLEANING SETTING
   (TELEPHONE DIRECTORY)

NAME    PHONE NUMBER   SETTING
AAA  :  0111-22-3333   : OFF
BBB  :  0222-44-5555   : ON
CCC  :  0333-66-7777   : ON
```

FACSIMILE APPARATUS AND PRINTING METHOD WITH CLEANING OF INK-JET NOZZLES BASED ON PRINT RESOLUTION OF RECEIVED IMAGE OR TELEPHONE NUMBER OF SENDER

The entire disclosure of Japanese Patent Application No. 2007-045094, filed Feb. 26, 2007 is expressly incorporated by reference herein.

BACKGROUND

1. Technical Field

The present invention relates to a facsimile apparatus that performs ink-jet facsimile printing. The invention further relates to an ink-jet facsimile printing method used by a facsimile apparatus.

2. Related Art

In the technical field to which the invention pertains, there is a facsimile apparatus that discharges ink onto a sheet of print target paper upon reception of facsimile data. Such a facsimile apparatus of the related art performs so-called ink-jet printing so as to output the received facsimile data. An example of the facsimile apparatus of the related art is described in JP-A-2001-245078.

Generally speaking, in a typical configuration of an ink-jet printing head, a large number of ink-discharging nozzles are arrayed as nozzle lines. In order to offer color-printing capability, a plurality of nozzles is arrayed for each of color components CMY, that is, cyan, magenta, and yellow, in addition to a plurality of nozzles that is arrayed for K, that is, black.

A typical ink-jet printing apparatus of the related art having the nozzle configuration described above is further provided with a cleaning mechanism that prevents the occurrence of poor discharging of ink from its nozzles. Upon reception of a command from a user for executing nozzle-cleaning operations, which is issued when the print head is not clean enough to output a print image of desired quality, the cleaning mechanism of the ink-jet printing apparatus of the related art performs the instructed nozzle cleaning so as to return the print head to a clean state, thereby ensuring good ink-discharging operations. Specifically, for example, the cleaning mechanism of the ink-jet printing apparatus of the related art wipes the nozzle surface of the print head by means of a wiping member thereof or performs "ink-flushing" operations, which is forcible discharging of ink drops from the nozzles, so as to clean the nozzles.

The facsimile apparatus described in JP-A-2001-245078 sometimes fail to print out received facsimile data in desired image quality. Specifically, it might receive facsimile data at the time when some nozzles of the print head thereof are not in a clean state so as to be able to output a print image of desired quality. If facsimile data is received at such a point in time, the facsimile apparatus described in JP-A-2001-245078 fails to print out the received facsimile data correctly or in desired image quality because ink is not discharged well during the execution of a printing job.

SUMMARY

An advantage of some aspects of the invention is to provide a facsimile apparatus that is capable of preventing ink from being discharged poorly during facsimile printing operations, thereby making it possible to output a facsimile image in good quality. In addition, the invention further provides, as an advantage of some aspects thereof, a facsimile printing method that is used by such a facsimile apparatus.

In order to address the above-identified problem without any limitation thereto, the invention provides, as a first aspect thereof, a facsimile apparatus that includes: a receiving section that receives facsimile data; a print head that discharges ink from nozzles so as to print out an image; a cleaning unit that cleans the nozzles of the print head; and a controlling section that controls the operations of the print head and the cleaning unit, wherein the controlling section commands the print head to perform facsimile printing by means of the received facsimile data only after the execution of nozzle-cleaning operations, which are executed by the cleaning unit under the control of the controlling section, if it is judged on the basis of the print image resolution of the received facsimile data that the execution of the nozzle-cleaning operations is necessary.

With such a configuration, since the controlling section commands the print head to perform facsimile printing by means of the received facsimile data only after the execution of nozzle-cleaning operations, which are executed by the cleaning unit under the control of the controlling section, if it is judged on the basis of the print image resolution of the received facsimile data that the execution of the nozzle-cleaning operations is necessary, it is possible to prevent ink from being discharged poorly during facsimile printing operations, thereby making it further possible to output a facsimile image in good quality.

In order to address the above-identified problem without any limitation thereto, the invention provides, as a second aspect thereof, a facsimile apparatus that includes: a storing section that stores setting data in which a telephone number and set information are associated with each other, the set information indicating whether to execute or not the nozzle-cleaning of the print head upon reception of facsimile data from a sender that corresponds to the telephone number; and a judging section that compares the telephone number of the sender of the received facsimile data and the setting data that is read out of the storing section so as to make a judgment as to whether the cleaning unit should execute the nozzle-cleaning operations or not, wherein the controlling section commands the print head to perform facsimile printing by means of the received facsimile data only after the execution of nozzle-cleaning operations, which are executed by the cleaning unit under the control of the controlling section, if it is judged by the judging section that the execution of the nozzle-cleaning operations is necessary.

With such a configuration, since a facsimile-printing job is performed only after the execution of the nozzle-cleaning operations for each facsimile data that is sent from the sender having a user-specified telephone number for which the nozzle cleaning is supposed to be executed. That is, if it is judged that the sender of the received facsimile data is a user-set communication party at the other end of a communication line for which nozzle-cleaning operations should be executed, a facsimile-printing job is performed only after the execution of the nozzle-cleaning operations. Therefore, it is possible to prevent ink from being discharged poorly during facsimile printing operations, thereby making it further possible to output a facsimile image in good quality. For example, if a user makes the arbitrary setting of data in such a manner that the nozzle-cleaning operations should be executed for not all but some selected senders that are indicated by the corresponding telephone numbers as high-quality communication "clients" that require a print image in high quality, it is possible to prevent ink from being discharged poorly during facsimile printing operations, thereby making it further possible to output a facsimile image in good quality, while efficiently skipping the nozzle-cleaning operations for the non-selected senders.

BRIEF DESCRIPTION OF THE DRAWINGS

The invention will be described with reference to the accompanying drawings, wherein like numbers reference like elements.

FIG. 5 is a diagram that schematically illustrates an example of the configuration of a nozzle-cleaning setting window according to an exemplary embodiment of the invention.

FIG. 6 is a diagram that schematically illustrates an example of the configuration of another nozzle-cleaning setting window according to an exemplary embodiment of the invention.

FIG. 7 is a diagram that schematically illustrates an example of the configuration of still another nozzle-cleaning setting window according to an exemplary embodiment of the invention.

DESCRIPTION OF EXEMPLARY EMBODIMENTS

With reference to the accompanying drawings, an exemplary embodiment of the invention is explained below.

Figure 1:
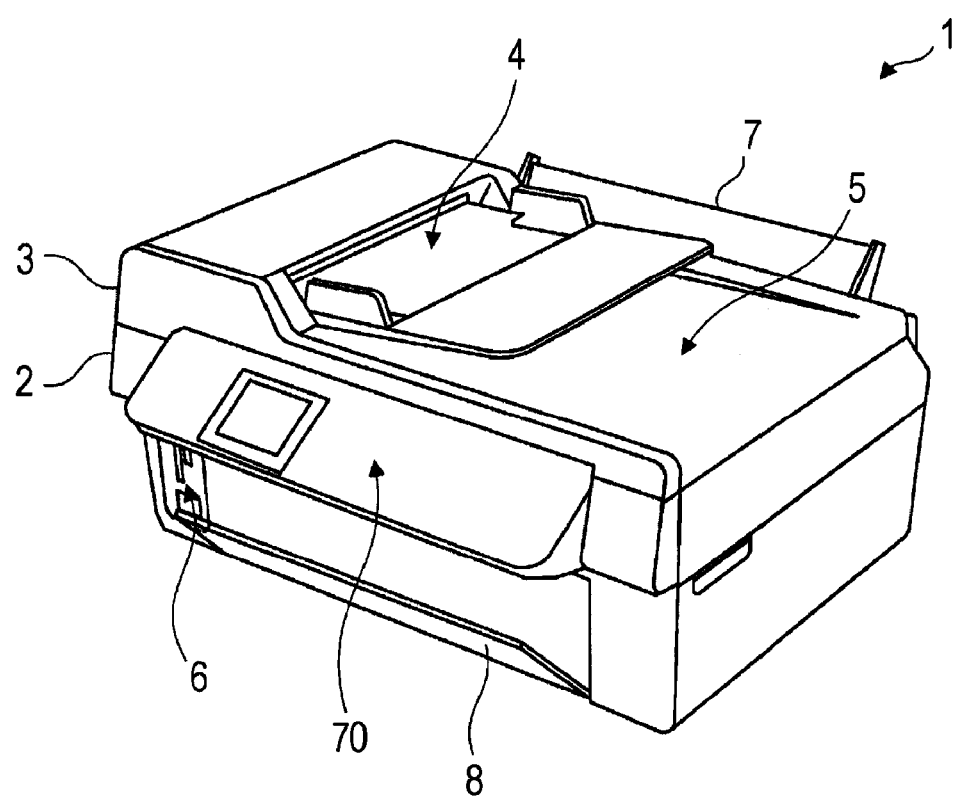
FIG. 1 is a perspective view that schematically illustrates an example of the general configuration of a multi-function printer according to an exemplary embodiment of the invention.

FIG. 1 is a perspective view that schematically illustrates an example of the general configuration of a multi-function printer (hereafter abbreviated as "MFP") according to an exemplary embodiment of the invention. As its name indicates, an MFP 1 is a so-called multi-function facsimile apparatus that has a plurality of functional capabilities. Specifically, the MFP 1 has a copying function, an external-device printing function, a facsimile communication function, and a memory-card printing function; that is, the MFP 1 is capable of copying an original document that is placed on an original copy table thereof; in addition, the MFP 1 is capable of executing a printing job under the control of an external device such as a host computer or a digital camera, though not limited thereto; moreover, the MFP 1 is capable of conducting facsimile communications; finally, the MFP 1 is further capable of printing out image data that is stored in a memory card. As illustrated in FIG. 1, the MFP 1 is provided with an original document cover 3, an original document paper feed tray 4, an original document paper eject tray 5, a memory slot 6, a print target paper feed tray (i.e., paper stacking tray) 7, and a printed-paper eject tray 8. The original document cover 3 covers the original document table of an MFP body 2 of the MFP 1. The original document paper feed tray 4 and the original document paper eject tray 5 are formed on or attached to the original document cover 3. The memory slot 6 is a receptacle slit into which a removable storage medium such as a memory card can be inserted. The original document cover 3 hinges on the MFP body 2 of the MFP 1 in such a manner that a user can open and close it so as to place an original document on the original document table of the MFP body 2 thereof. The print target paper feed tray 7 is configured in such a manner that print target paper of various sizes and types can be stacked thereon. A few non-limiting examples thereof include L-size photo paper and A4-size standard paper. A user operation panel unit 70 is mounted on the MFP body 2 of the MFP 1.

Figure 2:
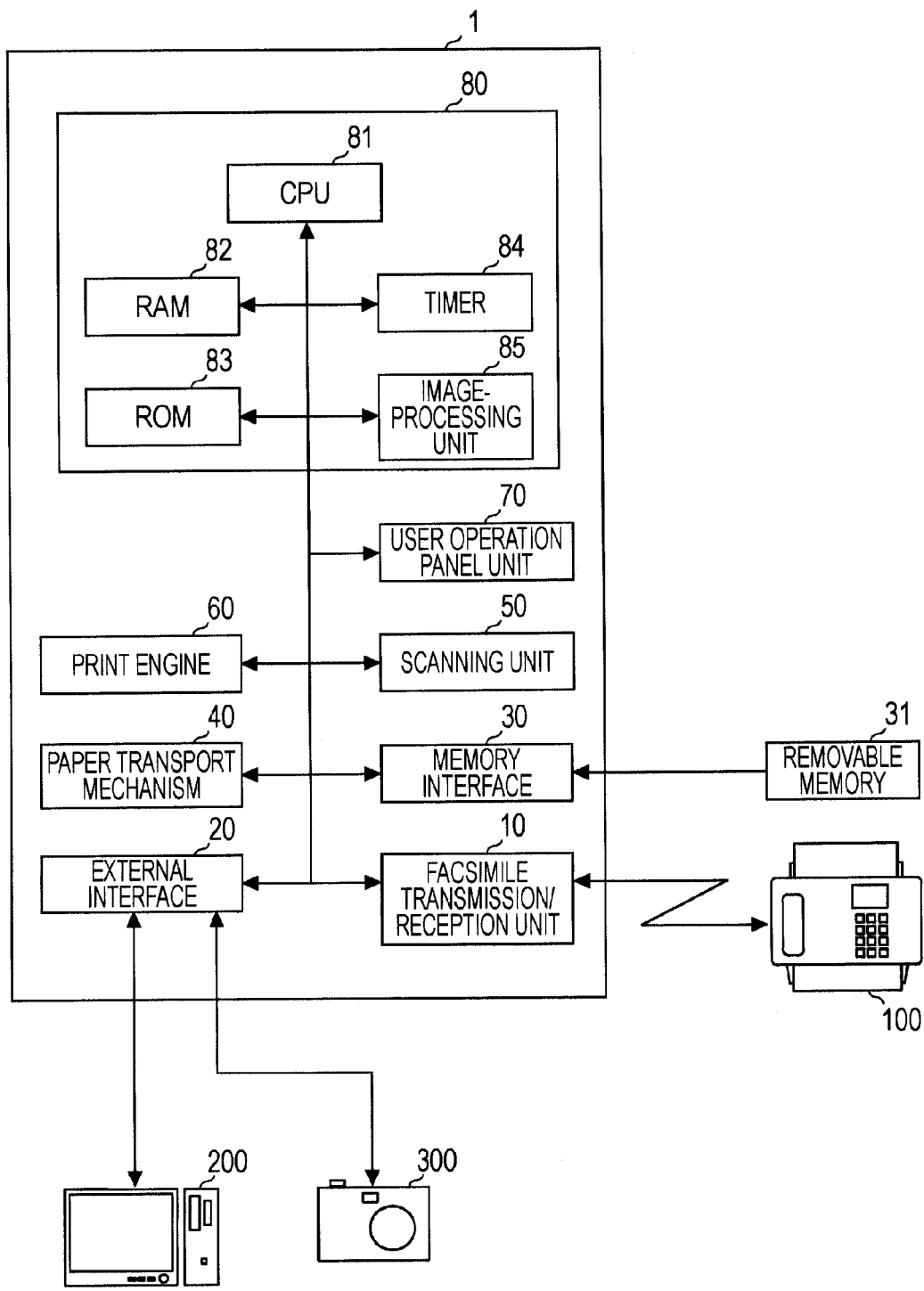
FIG. 2 is a diagram that schematically illustrates an example of the inner configuration of the multi-function printer according to an exemplary embodiment of the invention.

Next, the inner configuration of the MFP 1 is explained below. As illustrated in FIG. 2, the MFP 1 is provided with a facsimile transmission/reception unit (i.e., facsimile transceiver) 10, an external interface 20, a memory interface 30, a paper transport mechanism 40, a scanning unit 50, a print engine 60, the aforementioned user operation panel unit 70, and a controller 80. The controller 80 controls these inner components of the MFP 1. The facsimile transmission/reception unit 10 is a non-limiting example of a "receiving section" according to the invention. The controller 80 is a non-limiting example of a "controlling section" according to the invention.

The facsimile transmission/reception unit 10 is connected to other facsimile apparatuses 100 via a public switched telephone network (PSTN), that is, public phone line, and functions as an NCU (Network Control Unit) for making connection to the PSTN. In addition thereto, the facsimile transmission/reception unit 10 has a function of a modem that modulates/demodulates transmission/reception data. The facsimile transmission/reception unit 10 detects a ring signal and performs protocol control in compliance with ITU-T Recommendations, though the functions thereof are not limited thereto, so as to transmit facsimile data to other facsimile apparatus 100 and receives facsimile data therefrom.

The external interface 20 functions as an interface unit that is used for conducting communications with an external device. As illustrated in FIG. 2, the external interface 20 is connected to external devices such as a personal computer 200 and a digital camera 300, which are non-limiting examples of a variety of the external devices.

The memory interface 30 is an interface unit that allows access to a removable memory 31, which is inserted in the memory slot 6. The removable memory 31 is a nonvolatile storage medium that is, as its name suggests, detachably inserted into the memory slot 6. A non-limiting example of the removable memory 31 is a flash memory. Image data that is the target of printing is stored in the removable memory 31.

The paper transport mechanism 40 is a mechanical structure that transports a sheet of paper inside the MFP 1. The paper transport mechanism 40 is made up of a plurality of paper transport rollers and driving motors and the like. Specifically, the paper transport mechanism 40 picks up a sheet of original document paper that is placed on the original document paper feed tray 4 into the MFP 1. Then, the paper transport mechanism 40 transports the sheet of original document paper to the image-scanning surface area of the scanning unit 50. In addition, the paper transport mechanism 40 transports the sheet of print target paper placed on the print target paper feed tray 7 to the print engine 60. Moreover, the paper transport mechanism 40 transports the original document paper that has been scanned by the scanning unit 50 to the original document paper eject tray 5. Furthermore, the paper transport mechanism 40 transports the print-completed paper after being subjected to print processing at the print engine 60 to the printed-paper eject tray 8.

The scanning unit 50 is a scanner or an image reader that reads a sheet of original document paper that is set on the original document table so as to acquire a scanned image thereof. The scanning unit 50 is provided with an illumination unit such as a fluorescent lamp/tube or the like, an image sensor such as an array of CCD, CMOS, or the like, an AFE (Analog Front End) unit that is responsible for analog signal processing or the like, and a scanning mechanism that scans, that is, moves, the image sensor along the surface of the sheet of original document paper. The illumination unit of the scanning unit 50 illuminates the sheet of the original document paper that is transported to the image-scanning surface area of the scanning unit 50. While traveling along the surface of the sheet of original document paper under a driving force of the scanning mechanism, the image sensor of the scanning unit 50 captures, that is, picks up or takes in, light that is reflected by the sheet of the original document paper so as to generate an image signal thereof. The generated image signal is then subjected to a variety of signal processing at the AFE unit, which includes but not limited to signal amplification, noise cancellation, and A/D conversion. As the result of the A/D conversion, the format of the image signal is changed into digital one, that is, digital image data.

Figure 3:
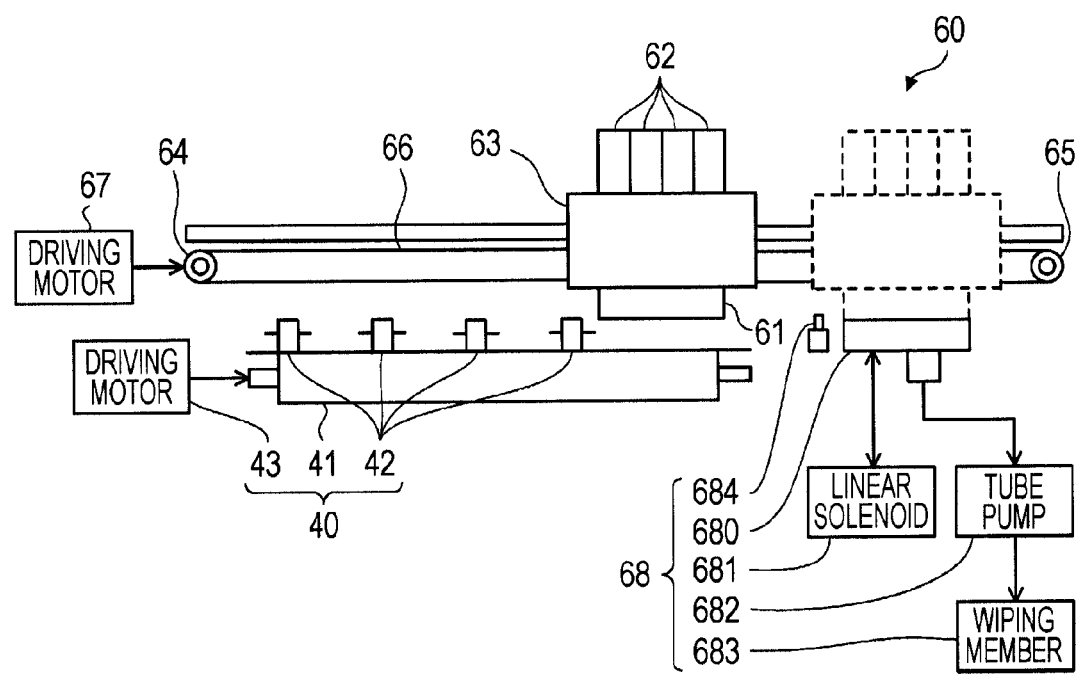
FIG. 3 is a diagram that schematically illustrates an example of the configuration of a print engine of the multi-function printer according to an exemplary embodiment of the invention.

The print engine 60 is responsible for performing printing on the sheet of print target paper that has been transported thereto by the paper transport mechanism 40. FIG. 3 is a diagram that schematically illustrates an example of the configuration of the print engine 60 of the MFP 1. As illustrated in FIG. 3, the print engine 60 is provided with a print head 61, ink cartridges 62, and a carriage 63. The print head 61 forms an image on a sheet of print target paper by discharging ink drops thereon in accordance with an ink-jet printing scheme. The print head 61 is mounted to the carriage 63. The ink cartridges 62 are detachably attached to the carriage 63.

The print head 61 has nozzle lines each of which is made up of a plurality of ink-discharging nozzles. The print head 61 is further provided with ink flow channels, pressure generation chambers, and piezoelectric vibration elements. These ink flow channels, pressure generation chambers, and piezoelectric vibration elements are formed/provided for each of the nozzles of C, M, Y, and K. Each of the ink cartridges 62 has an ink tank inside thereof. When the ink cartridge 62 is attached to the carriage 63, the ink tank of the ink cartridge 62 becomes in communication with the ink flow channels formed in the print head 61. Then, ink is filled into the pressure generation chambers of the print head 61 via the ink flow channels thereof.

The carriage 63 is fixed to a timing belt 66, which is wound around a driving pulley 64 at one side and a driven pulley 65 at the other side with an adequate tension therebetween. The driving pulley 64 is connected to a driving motor 67. As the driving motor 67 is rotated under the control of the controller 80, the driving pulley 64 and the driven pulley 65 are rotated. As these pulleys rotate, the carriage 63 that is fixedly attached to the timing belt 66 moves together with the timing belt 66.

The print engine 60 is further provided with, as its inner components, a paper feed roller 41, which functions as a master driving roller that provides a paper-transporting force, a plurality of slave driven rollers 42, and a driving motor 43. The slave driven rollers 42 are provided in such a manner that the master-driving paper feed roller 41 and the slave driven rollers 42 work in combination with each other to hold a sheet of print target paper, which is sandwiched therebetween, and transports it. The driving motor 43 provides a rotational driving force to the master-driving paper feed roller 41. When the driving motor 43 is operated under the control of the controller 80, the master-driving paper feed roller 41 rotates. As the master-driving paper feed roller 41 rotates, the sheet of print target paper that is supported between the master-driving paper feed roller 41 and the slave driven rollers 42 is transported in a direction that is perpendicular to the traveling direction of the carriage 63.

While moving the carriage 63 in the direction orthogonal to the paper transport direction, the print engine 60 energizes the piezoelectric vibration elements under the control of the controller 80 so as to discharge ink that is retained in the pressure generation chambers from the nozzles of the print head 61. In this way, the print engine 60 forms dots on the sheet of print target paper so as to output a printed image.

The print engine 60 is further provided with a cleaning unit 68. The cleaning unit 68 is used for cleaning the print head 61. The cleaning unit 68 has a cap 680, a linear solenoid 681, a tube pump 682, an absorber 683, and a wiping member 684. The linear solenoid 681 reciprocates, that is, moves forward and backward, the cap 680 along the nozzle surface of the print head 61. The tube pump 682 draws ink that clogs, or is otherwise retained at, the nozzle surface of the print head 61 via the cap 680. The absorbing material 683 absorbs the ink that is drawn through the tube pump 682. Upon reception of an instruction for nozzle cleaning from the controller 80, wiping operations or flushing operations are performed. Specifically, under the control of the controller 80, the carriage 63 is reciprocated against the wiping member 684 while the wiping member 684 is lightly in contact with the nozzle surface of the print head 61. In this way, the nozzle surface of the printing head 61 is wiped. Or, the printing head 61 "flushes", that is, forcibly discharges, ink toward an ink absorber that is provided in the cap 680 so as to prevent the nozzles from becoming dried. The cleaning unit 68 conducts nozzle-cleaning operations as explained above.

Figure 4:
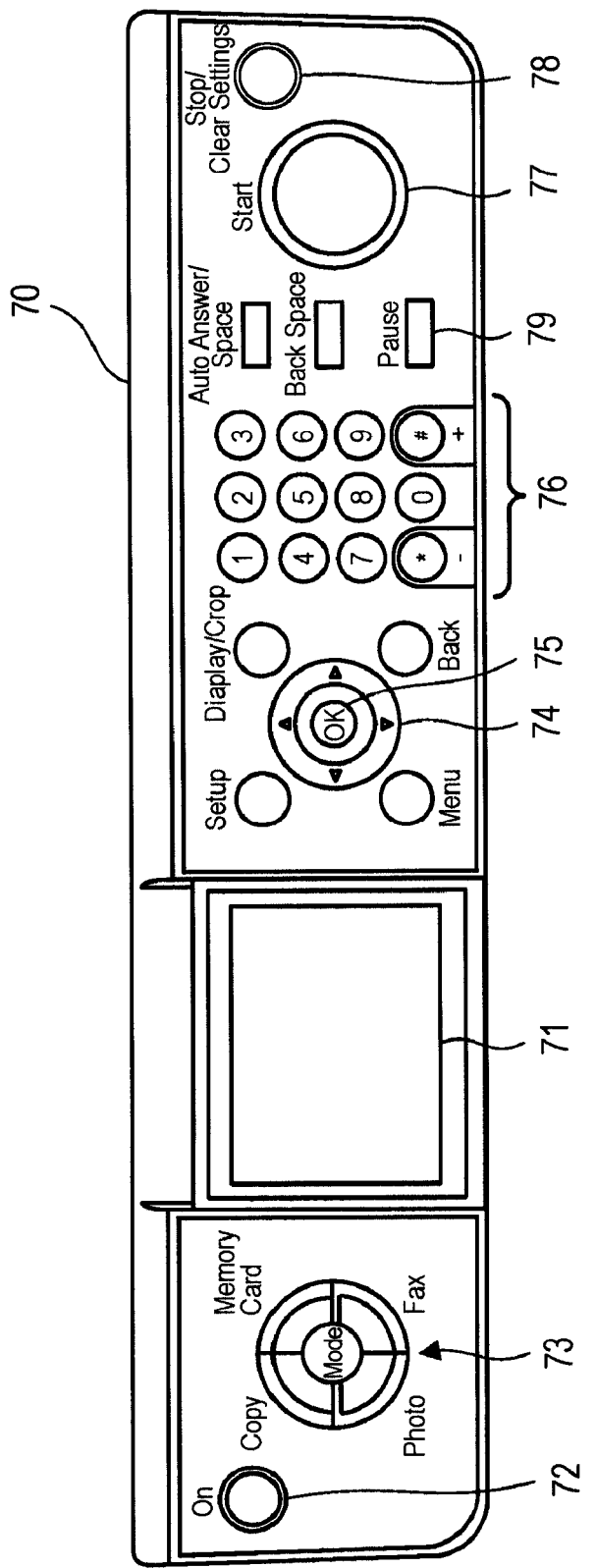
FIG. 4 is an enlarged view that schematically illustrates an example of the configuration of a user operation panel unit of the multi-function printer according to an exemplary embodiment of the invention.

The user operation panel unit 70 is an interface that receives various kinds of instructions for the operations of the MFP 1 from a user. FIG. 4 is an enlarged view that schematically illustrates an example of the configuration of the user operation panel unit 70. As illustrated in FIG. 4, the user operation panel unit 70 is provided with a display panel 71 such as LCD (Liquid Crystal Display) or the like, and a variety of switches that includes but not limited to a power switch 72, an operation mode selection switch 73, a cursor switch 74, a selection switch 75, a ten key pad 76, a print OK switch 77, a print stop/clear switch 78, and a print pause switch 79.

The controller 80 is a functional block that is responsible for managing/controlling the entire operations of the MFP 1. The controller 80 is made up of, though not necessarily limited thereto, a CPU (Central Processing Unit) 81, a RAM (Random Access Memory) 82, a ROM (Read Only Memory) 83, a timer 84, and an image-processing unit 85. The ROM 83 is a non-limiting example of a "storing section" according to the invention. The ROM 83 is a nonvolatile memory. A few non-limiting examples of the ROM 83 include a flash memory and an EEPROM (Electrically Erasable Programmable Read-Only Memory). A control program, a telephone directory, and setting data the detail of which will be described later are stored in the ROM 83 in advance. The RAM 82 is a general-purpose memory that is used as, for example, an input/output buffer, a working memory, and the like. The CPU 81 is the central control unit of the MFP 1. The CPU 81 executes the control program that is stored in the ROM 83 so as to control the operation of the components of the MFP 1.

The timer 84 has a crystal/quartz oscillator and a counter circuit. The crystal/quartz oscillator generates a pulse that has a certain frequency. On the basis of the pulses that are generated by the crystal/quartz oscillator, the timer 84 counts the number of pulses so as to measure time. The image-processing unit 85 is a hardware that performs various kinds of image processing in cooperation with the CPU 81. For example, the image-processing unit 85 performs a series of image processing such as gamma correction, shading correction, JPEG-format encoding and the like on image data that has been outputted from the scanning unit 50. In addition, the image-processing unit 85 performs a series of image processing such as JPEG-format decoding, resolution conversion, "unsharp" processing, scale/gradation correction, halftone processing, CMYK separation processing, and the like on image data that will be outputted to the print engine 60. A non-limiting example of the image-processing unit 85 is a DSP (Digital Signal Processor).

The ROM 83 memorizes setting data that indicates the execution conditions of nozzle-cleaning operations. The setting data indicates, or in other words, predetermines, whether to execute or skip the nozzle-cleaning operations of the print head 61 for each of setting items that includes, in this example, print-image resolution, color-print setting, and telephone numbers registered in the telephone directory.

A user can manipulate the user operation panel unit 70 to confirm the setting data and/or change the settings thereof. For example, when a user presses buttons/switches of the user operation panel unit 70 so as to confirm the setting regarding print-image resolution, a nozzle-cleaning setting window SG1 appears on the display panel 71 of the user operation panel unit 70. An example of the nozzle-cleaning setting window SG1 is shown in FIG. 5. As illustrated in FIG. 5, there are three types of print-image resolutions that are available alternatively, that is, "normal mode", "fine mode", and "super-fine mode". In the illustrated example, it is set that nozzle-cleaning operations are to be performed for the "fine mode" and the "super-fine mode", which are relatively high in resolution than that of the "normal mode", whereas it is set that nozzle-cleaning operations are to be skipped for the "normal mode".

When a user presses buttons/switches of the user operation panel unit 70 so as to confirm the color-print setting, a nozzle-cleaning setting window SG2 appears on the display panel 71 of the user operation panel unit 70. An example of the nozzle-cleaning setting window SG2 is shown in FIG. 6. As illustrated in FIG. 6, there are two types of color-print settings that are available alternatively, that is, "color-print mode" and "monochrome-print mode". In the illustrated example, it is set that nozzle-cleaning operations are to be performed for the "color-print mode" whereas it is set that nozzle-cleaning operations are to be skipped for the "monochrome-print mode".

When a user presses buttons/switches of the user operation panel unit 70 so as to confirm the setting regarding telephone numbers registered in the telephone directory, a nozzle-cleaning setting window SG3 appears on the display panel 71 of the user operation panel unit 70. An example of the nozzle-cleaning setting window SG3 is shown in FIG. 7. In the nozzle-cleaning setting window SG3, it is listed whether to execute or skip nozzle-cleaning operations for each of the telephone numbers registered in the telephone directory. Note that the user can arbitrarily change the nozzle-cleaning ON/OFF setting for each of the telephone numbers registered in the telephone directory by manipulating the buttons/switches of the user operation panel unit 70. That is, the user can make the nozzle-cleaning ON/OFF setting as they desires so that nozzle-cleaning operations are to be executed for calls from the selected telephone numbers registered in the telephone directory but nozzle-cleaning operations are to be skipped for calls from the non-selected telephone numbers registered in the telephone directory.

As explained above, it is preset whether to execute or skip the nozzle-cleaning operations of the print head 61 for each of setting items that includes, in this example, the print-image resolution, the color-print setting, and the telephone numbers registered in the telephone directory.

Figure 8:
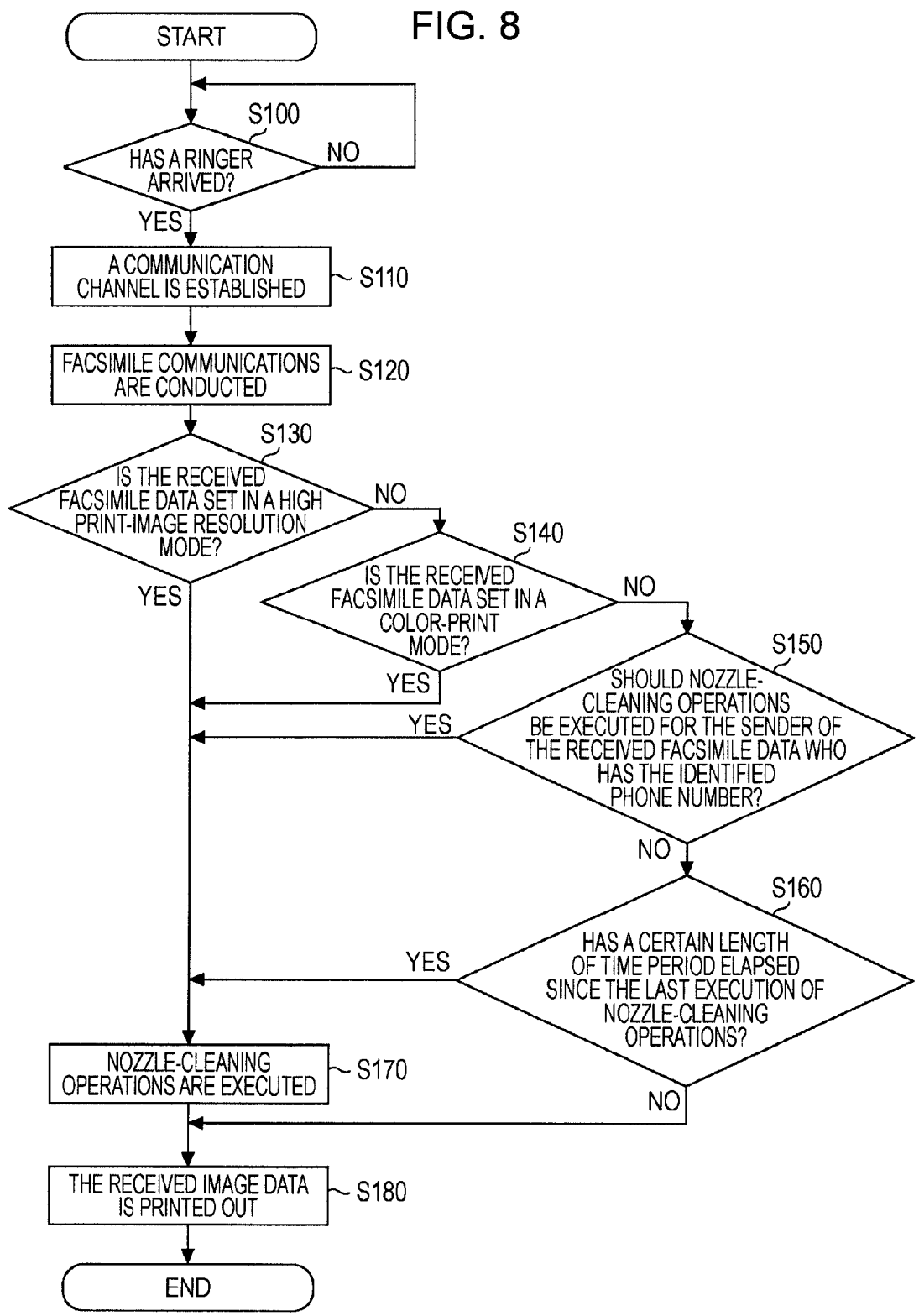
FIG. 8 is a flowchart that schematically illustrates an example of the series of facsimile-printing processing flow according to an exemplary embodiment of the invention.

Next, while making reference to the flowchart shown in FIG. 8, a series of facsimile print processing that the MFP 1 performs upon reception of facsimile data is explained below.

After starting the facsimile print processing flow, the CPU 81 judges whether a "ringer" has arrived through the PSTN or not (step S100). In the example described herein, the CPU 81 makes an inquiry to the facsimile transmission/reception unit 10 whether the facsimile transmission/reception unit 10 has detected a ring signal or not. If the facsimile transmission/reception unit 10 has not yet detected any ring signal (step S100: No), it continues to wait for the arrival of ring signal. During the wait of a ring signal, the process returns to the step S100 periodically, that is, cyclically, at each lapse of a predetermined length of waiting time period. Upon the detection of a ring signal at the facsimile transmission/reception unit 10 (step S100: Yes), the CPU 81 commands the facsimile transmission/reception unit 10 to establish a communication (channel) with other facsimile apparatus 10 that is the sender of the received ring signal (step S110).

Next, the CPU 81 commands the facsimile transmission/reception unit 10 to conduct a facsimile communication with the above-mentioned ringer-sender facsimile apparatus 100 via the established communication line (step S120). Then, the facsimile transmission/reception unit 10 receives facsimile data from the ringer-sender facsimile apparatus 100. The facsimile transmission/reception unit 10 transfers the received facsimile data to the input buffer of the RAM 82.

Next, the CPU 81 judges whether the setting of the received facsimile data is in a high print-image resolution mode or not (step S130). If it is judged that the setting of the received facsimile data is in a high print-image resolution mode, that is, if it is in either the "super-fine mode" or the "fine mode" (step S130: Yes), the process goes to a step S170. On the other hand, if it is judged that the setting of the received facsimile data is not in a high print-image resolution mode, that is, if it is in the "normal mode" (step S130: No), the process goes to a step S140.

At the step S140, the CPU 81 judges whether the setting of the received facsimile data is in the color-print mode or not. If it is judged that the setting of the received facsimile data is in the color-print mode (step S140: Yes), the process goes to the step S170. On the other hand, if it is judged that the setting of the received facsimile data is not in the color-print mode (step S140: No), the process goes to a step S150.

At the step S150, the CPU 81 judges whether the sender of the received facsimile data is a nozzle-cleaning "user-specified" client or not. That is, the CPU 81 judges whether the sender of the received facsimile data is a user-set communication party at the other end of a communication line for which nozzle-cleaning is supposed to be executed or not. Further in other words, the CPU 81 judges whether the user setting indicates that nozzle-cleaning operations should be executed for the sender of the received facsimile data or not. In this judgment step, the CPU 81 refers to the setting data stored in the ROM 83 so as to compare the referred data with the telephone number of the sender of the received facsimile data. If it is judged that the sender of the received facsimile data is a user-specified client that requires nozzle-cleaning operations; in other words, if it is judged that the user setting indicates that nozzle-cleaning operations should be executed for the sender of the received facsimile data (step S150: Yes), the process goes to the step S170. On the other hand, if it is judged that the sender of the received facsimile data is not a user-specified client that requires nozzle-cleaning operations; in other words, if it is judged that the user setting indicates that nozzle-cleaning operations should be skipped for the sender of the received facsimile data (step S150: No), the process goes to the step S160. Note that any telephone number that is not registered in the telephone directory and/or the setting data may be judged as a client that does not require nozzle-cleaning operations; in other words, nozzle-cleaning operations may be skipped for the sender of the received facsimile data that is not registered therein.

At the step S160, the CPU 81 judges whether a certain length of time period has elapsed or not since the last execution of nozzle-cleaning operations. In this judgment step, the CPU 81 refers to the timer 84 so as to calculate the length of time period that has elapsed since the last execution of nozzle-cleaning operations. Then, the CPU 81 judges whether the calculated length of time period that has elapsed since the last execution of nozzle-cleaning operations exceeds a predetermined threshold length of time period. If it is judged that the calculated length of time period that has elapsed since the last execution of nozzle-cleaning operations exceeds the predetermined threshold length of time period (step S160: Yes), the process goes to the step S170. On the other hand, if it is judged that the calculated length of time period that has elapsed since the last execution of nozzle-cleaning operations does not exceed the predetermined threshold length of time period (step S160: No), the process goes to a step S180.

At the step S170, the CPU 81 commands the cleaning unit 68 of the print engine 60 to execute nozzle-cleaning operations. After the cleaning of the print head 61 through the execution of nozzle-cleaning operations, the process goes to the step S180.

At the step S180, the CPU 81 commands the print engine 60 to output a printed image of the received facsimile data. Then, the series of facsimile print processing illustrated in FIG. 8 ends.

As explained above, upon reception of facsimile data, the CPU 81 of the MFP 1 according to an exemplary embodiment of the invention controls other components thereof so as to execute a facsimile printing job only after the execution of nozzle-cleaning operations if the setting of the received facsimile data is in a high print-image resolution mode, if the setting of the received facsimile data is in the color-print mode, if the sender of the received facsimile data is a nozzle-cleaning target client having a set telephone number that is registered in the telephone directory for which nozzle-cleaning operations should be executed, or if the calculated length of time period that has elapsed since the last execution of nozzle-cleaning operations exceeds the predetermined threshold length of time period.

Having such a configuration, the MFP 1 according to an exemplary embodiment of the invention described above offers the following advantageous effects.

(1) Since the MFP 1 according to an exemplary embodiment of the invention is configured to perform facsimile printing only after the execution of nozzle-cleaning operations, which are executed if necessary, it is possible to prevent ink from being discharged poorly during facsimile printing operations even without any specific instruction given from a user, thereby making it possible to output a facsimile image in good quality.

(2) Since the MFP 1 according to an exemplary embodiment of the invention is configured to perform facsimile printing only after the execution of nozzle-cleaning operations specifically if the setting of the received facsimile data is in a high print-image resolution mode, it is possible to prevent ink from being discharged poorly during such a high-print-image-resolution facsimile printing operations, thereby making it possible to output a facsimile image in good quality. In a high-print-image-resolution facsimile printing, the degradation in ink-discharge performance is less tolerable to a user than in the case of a low-print-image-resolution facsimile printing. In this respect, since the MFP 1 according to an exemplary embodiment of the invention is configured to perform facsimile printing only after the execution of nozzle-cleaning operations specifically if the setting of the received facsimile data is in a high print-image resolution mode, it is possible to prevent ink from being discharged poorly during such a high-print-image-resolution facsimile printing operations, thereby making it possible to output a facsimile image in good quality. Such a configuration makes it possible to enhance user-friendliness.

(3) Since the MFP 1 according to an exemplary embodiment of the invention is configured to perform facsimile printing only after the execution of nozzle-cleaning operations specifically if the setting of the received facsimile data is in the color-print mode, it is possible to prevent ink from being discharged poorly during such a color facsimile printing operations, thereby making it possible to output a facsimile image in good quality. In a color facsimile printing, the degradation in ink-discharge performance is less tolerable to a user than in the case of a monochrome facsimile printing. In this respect, since the MFP 1 according to an exemplary embodiment of the invention is configured to perform facsimile printing only after the execution of nozzle-cleaning operations specifically if the setting of the received facsimile data is in the color-print mode, it is possible to prevent ink from being discharged poorly during such a color facsimile printing operations, thereby making it possible to output a facsimile image in good quality. Such a configuration makes it possible to enhance user-friendliness.

(4) Since the MFP 1 according to an exemplary embodiment of the invention is configured to perform facsimile printing only after the execution of nozzle-cleaning operations specifically if the sender of the received facsimile data is a nozzle-cleaning target client having a set telephone number that is registered in the telephone directory for which nozzle-cleaning operations should be executed, it is possible to prevent ink from being discharged poorly during the printing of the facsimile data received from such a specifically-set nozzle-cleaning target client even without any specific instruction given from a user, thereby making it possible to output a facsimile image in good quality. Such a configuration makes it possible to enhance user-friendliness.

(5) Since the MFP 1 according to an exemplary embodiment of the invention is configured to execute nozzle-cleaning operations if the degradation in ink-discharge performance is comparatively intolerable to a user, which is determined depending on the above-described factors such as the nature/type of the received facsimile data and the sender thereof, it is possible to avoid or at least minimize the wasteful consumption of ink due to the execution of nozzle-cleaning operations while effectively preventing ink from being discharged poorly during facsimile printing operations, thereby making it possible to output a facsimile image in good quality.

(6) Since the MFP 1 according to an exemplary embodiment of the invention is configured to perform facsimile printing only after the execution of nozzle-cleaning operations specifically if the calculated length of time period that has elapsed at the time of reception of facsimile data since the last execution of nozzle-cleaning operations exceeds the predetermined threshold length of time period, it is possible to prevent ink from being discharged poorly during facsimile printing operations, thereby making it possible to output a facsimile image in good quality.

Although an exemplary embodiment of the invention is explained in detail above, needless to say, the invention should be in no case understood to be restricted to the above-described exemplary embodiment; the invention may be configured and/or implemented in an adaptable manner in a variety of variations and/or modifications thereof without departing from the spirit and scope of the invention. In the following description, a few non-limiting variation examples thereof are explained.

Variation Examples 1

In the exemplary embodiment of the invention described above, it is explained that a judgment as to whether to execute or skip nozzle-cleaning operations is made on the basis of three conditions, that is, whether the setting of the received facsimile data is in a high print-image resolution mode or not, whether the setting of the received facsimile data is in the color-print mode or not, or whether the sender of the received facsimile data is a nozzle-cleaning target client having a set telephone number that is registered in the telephone directory for which nozzle-cleaning operations should be executed or not. Notwithstanding the foregoing, a judgment as to whether to execute or skip nozzle-cleaning operations may be made on the basis of one or two of these three conditions.

Variation Example 2

In the exemplary embodiment of the invention described above, it is explained that, as for the print-image resolution and the color-print setting, the nozzle-cleaning ON/OFF state, that is, whether to execute or skip nozzle-cleaning operations, is preset as illustrated in FIGS. 5 and 6. However, as in the nozzle-cleaning ON/OFF setting of the telephone numbers registered in the telephone directory, the nozzle-cleaning ON/OFF setting for the print-image resolution and the color printing may be also changed arbitrarily by a user as they presses the buttons/switches of the user operation panel unit 70.

Variation Example 3

In the exemplary embodiment of the invention described above, it is explained that the invention is applied to a multi-function printer. However, the invention is not limitedly applicable to the multifunction printer but also applicable to a variety of printing apparatuses having a facsimile function. As a few non-limiting examples thereof, the invention is applicable to a facsimile, a printer having a facsimile function, and a facsimile system having a host computer and a printer terminal.

What is claimed is:

1. A facsimile apparatus comprising:
a receiving section that receives facsimile data;
a print head that discharges ink from nozzles so as to print out an image;
a cleaning unit that cleans the nozzles of the print head; and
a controlling section that controls the operations of the print head and the cleaning unit,
wherein the controlling section commands the print head to perform facsimile printing by means of the received facsimile data only after the execution of nozzle-cleaning operations, which are executed by the cleaning unit under the control of the controlling section, if it is judged on the basis of the print image resolution of the received facsimile data that the execution of the nozzle-cleaning operations is necessary.

2. The facsimile apparatus according to claim 1, wherein the controlling section controls the operations of the print head so as to offer a plurality of print-image-resolution modes that includes at least a high print-image-resolution mode; and the controlling section commands the cleaning unit to execute the nozzle-cleaning operations if the print image resolution of the received facsimile data is set in the high print-image-resolution mode.

3. A facsimile apparatus comprising:
a receiving section that receives facsimile data;
a print head that discharges ink from nozzles so as to print out an image;
a cleaning unit that cleans the nozzles of the print head;
a controlling section that controls the operations of the print head and the cleaning unit;
a storing section that stores setting data in which a telephone number and set information are associated with each other, the set information indicating whether to execute or not the nozzle-cleaning of the print head upon reception of facsimile data from a sender that corresponds to the telephone number; and
a judging section that compares the telephone number of the sender of the received facsimile data and the setting data that is read out of the storing section so as to make a judgment as to whether the cleaning unit should execute the nozzle-cleaning operations or not,
wherein the controlling section commands the print head to perform facsimile printing by means of the received facsimile data only after the execution of nozzle-cleaning operations, which are executed by the cleaning unit under the control of the controlling section, if it is judged by the judging section that the execution of the nozzle-cleaning operations is necessary.

4. A facsimile-printing method used by a facsimile apparatus that has a print head that discharges ink from nozzles so as to print out an image; the facsimile-printing method comprising:
cleaning the nozzles of the print head upon the reception of facsimile data if it is judged on the basis of the print image resolution of the received facsimile data that the execution of the nozzle-cleaning operations is necessary; and
performing facsimile printing by means of the received facsimile data after the cleaning of the nozzles of the print head.

5. A facsimile-printing method used by a facsimile apparatus that has a print head that discharges ink from nozzles so as to print out an image; the facsimile-printing method comprising:
receiving facsimile data;
judging whether to execute the nozzle-cleaning of the print head or not on the basis of a telephone number of a sender of the received facsimile data;
cleaning the nozzles of the print head if it is judged that the execution of the nozzle-cleaning operations is necessary; and
performing facsimile printing by means of the received facsimile data after the cleaning of the nozzles of the print head.

* * * * *